May 13, 1947.     S. HINE     2,420,316
PERSPECTIVE PROJECTOR AND ENLARGER
Filed April 4, 1945     2 Sheets-Sheet 1

SHELDON HINE.
By Ralph L Chappell
Attorney

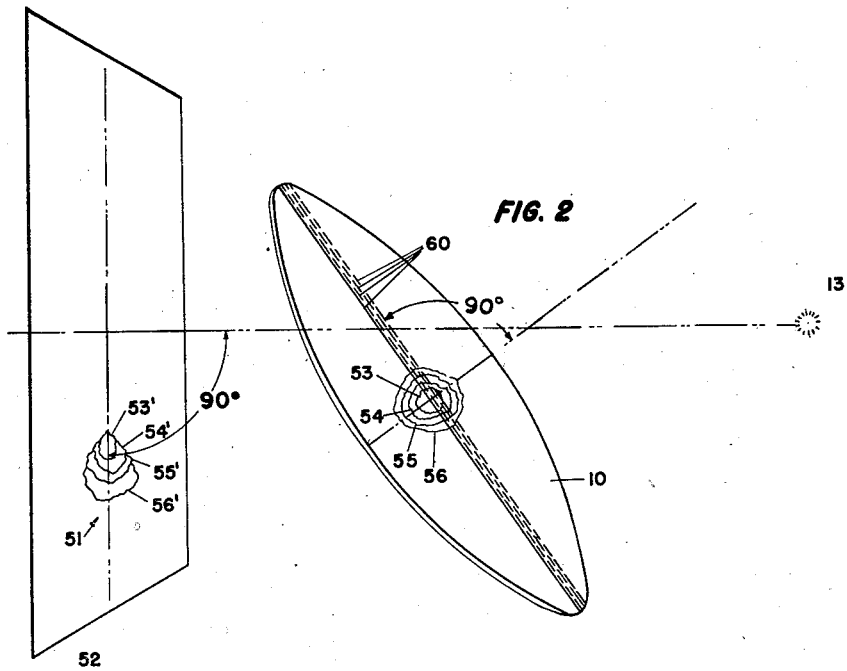
FIG. 2
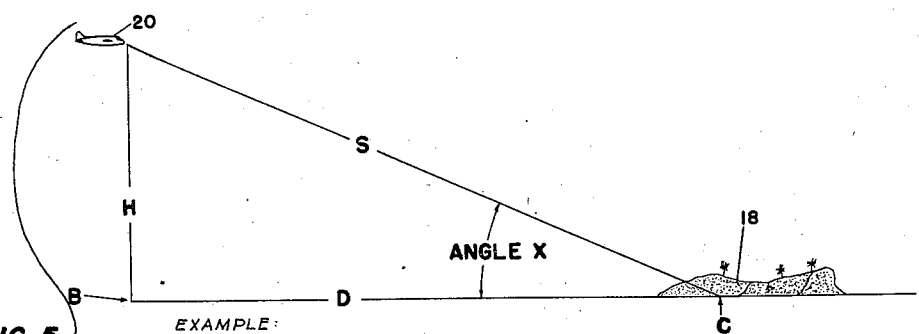
FIG. 5
EXAMPLE:
H = 30,000 FT.
D = 5 MILES
TAN ANGLE $X = \dfrac{30,000'}{5 \times 5280} = \dfrac{30,000'}{26,400} = 1.13636$
ANGLE $X = 48° 39'$.
TAN ANGLE $X = \dfrac{H}{D}$
$\triangle ABC$ IS SIMILAR $\triangle abc$.
$\dfrac{s}{S}$ = SCALE OF MAP TRACED ON ACETATE.
$S = \dfrac{s}{\text{SCALE OF MAP}}$
$S = \dfrac{H}{\text{SIN ANGLE X}}$
$s = \dfrac{H}{\text{SIN ANGLE X} \times \text{SCALE OF MAP}}$
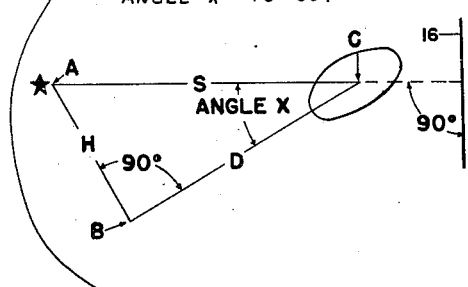
Inventor
SHELDON HINE
By Ralph L Chappell
Attorney Patented May 13, 1947

2,420,316

UNITED STATES PATENT OFFICE 2,420,316

PERSPECTIVE PROJECTOR AND ENLARGER

Sheldon Hine, United States Navy

Application April 4, 1945, Serial No. 586,616

3 Claims. (Cl. 35—26)

(Granted under the act of March 3, 1883, as amended April 30, 1928; 370 O. G. 757)

This invention relates to a perspective projector and enlarger and has for an object to provide a device by use of which a map may be accurately reproduced in an enlargement or in a perspective or in an enlarged perspective upon a delineating surface by a person using a pencil, tool, marking implement, or other recording method.

A further object of this invention is to provide a means of reproducing a contour map in any desired perspective corresponding to a desired angle and altitude from the area of such map.

Still a further object of this invention is to reproduce a contour map in such a perspective form that it will accurately reproduce the area of the map as it would appear from an aircraft at a particular angle and altitude therefrom.

Still another object of this invention is to provide a means for reproducing a map or other object in any desired perspective and for reproducing a contour map so that the map would have the same perspective as the actual area would have when viewed from a predetermined altitude and angle.

With the foregoing and other objects in view, the invention consists in the construction, commination and arrangement of parts hereinafter set forth, claimed and illustrated in the drawings in which:

Fig. 2 is a schematic perspective view showing the making of a perspective contour map.

Fig. 3 is an enlarged perspective fragmentary detailed view.

Fig. 4 is a top plan view of Fig. 3, and

Fig. 5 is a diagrammatic view used in preparing perspective angle tables.

Figure 1:
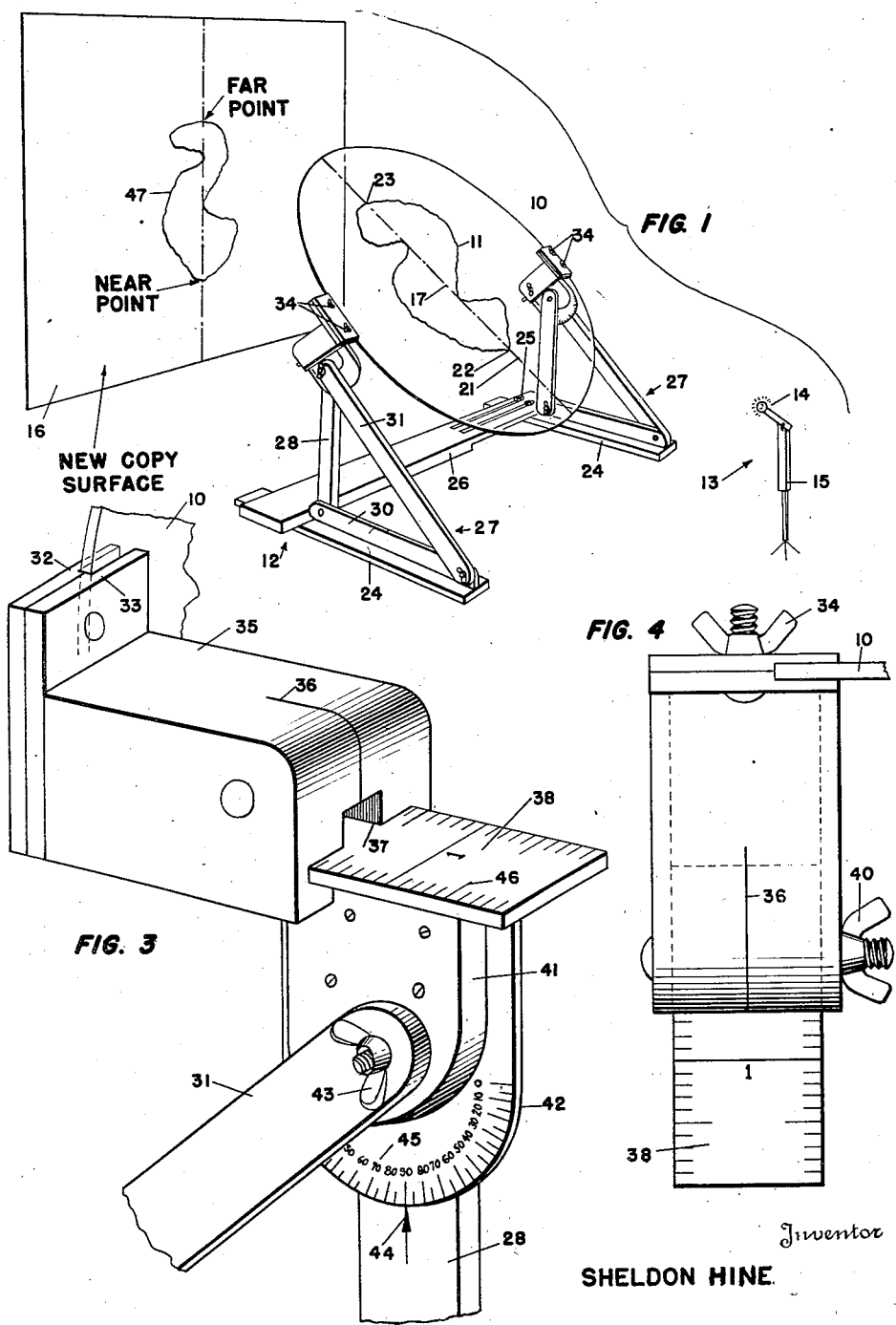
Fig. 1 is a perspective view of the invention in use making a perspective.

This invention includes the feature of converting a flat map into a perspective map so that the perspective map will show the appearance of an area from any particular altitude and angle of approach within the limits of visibility to assist in identifying the area. The device for performing this feature includes three principal parts, a circular disc 10 of transparent material, preferably acetate, on which is traced the map 11 being processed, a knockdown stand 12 on which the acetate disc 11 is adjustably mounted, and a source of light 13 such as a flashlight 14 mounted on a supporting stand 15. In addition, of course, there is a new copy surface 16 on which the finished perspective map is being prepared. The circular acetate disc 11 has its center 17 marked by a cross and the map outline 11 is placed thereon by tracing it with India drawing ink or China marking pencil. To facilitate the application of the India ink, a light dusting of talcum powder may be first placed thereon and when a different map is to be placed thereon, the previous tracing may be washed off.

The maps to be produced by this invention are especially intended for use by aircraft which will approach the area at a given altitude H and given angle X so that the area such as an island 18 will have the same appearance on the finished map that it has from the aircraft 20 when it is at the altitude H and distance D and angle X. When tracing the map 11 on to the acetate disc 10 the map should be properly oriented according to the bearing at which the area or island 18 will be approached. The acetate disc 10 should be so placed on the map that a diameter line 21 will pass through both the near point 22 and the far point 23 on the map when tracing the image 11 thereon.

The frame 12 on which the acetate disc 10 is mounted includes a pair of feet 24 adapted to be adjustably connected as at 25 by an adjustable crossbrace 26. Supported on each foot 24 is a knockdown triangular upright 27 including a short vertical leg member 28, a base member 30 and hypotenuse member 31. The acetate disc 10 is mounted on the pair of triangular uprights 27 so that it may be adjusted both angularly and vertically. The disc 10 is secured between a pair of clamping plates 32 and 33 by means of bolts and wing nuts 34, having been first properly oriented so that the diameter line 21 locates the map 11 at the proper bearing. The clamping plate 33 is mounted on one end of a block 35 whose other end is split as at 36 and countersunk as at 37 so that it may slide on to a graduated scale 38 and be secured thereon in any adjusted position within the limits thereof by means of a bolt and wing nut 40.

The scale 38 is in turn mounted on the top of a supporting plate 41 to which is secured a protractor 42. The supporting plate 41 is pivotally secured by means of a bolt and wing nut 43 between the vertical leg 28 and the hypotenuse leg 31 of the triangular upright 27. The vertical leg 28 is provided with an arrow 44 for cooperation with the protractor graduations 45. As a result of this construction, the disc 10 may be angularly adjusted as desired by loosening the bolt and wing nut 43 and rotating the disc 10 about this pivot as indicated by the protractor 42 to a desired angle. Likewise, the vertical height of the disc 10 may be changed while maintaining it at the same angle by loosening the bolt and wing nut 40 and sliding the block 35 along the graduated scale 38 any desired distance as indicated by the graduations 46 thereon which are pivotally graduated in tenths of an inch.

The light source 13, which includes a reflectorless flashlight 14 maintained on a support 15, is so placed with relation to the circular disc 10 that the rays from the light source 13 passing through the acetate disc 10 will project a shadow of the map 11 thereon on to a new copy surface 16 placed therebehind and appear on the new copy surface as a shadow outline 47, which outline 47 may be traced thereon in pencil or ink to make the same permanent so that it may be photographed or otherwise reproduced.

As shown in Fig. 1, the map 47 reproduced on the new copy surface 16 is, of course, a perspective determined by the angle at which the disc 10 has been placed with relation to the light source 13. If a straight enlargement without any perspective is desired, the circular disc 10 will be placed at the vertical angle of 90 degrees, parallel to the plane of the new copy surface 16 and the flashlight 14 will be placed at the same elevation as the center 17 of the disc 10. In order to determine that a true enlargement is being produced with no angular distortions, as well as to measure the amount of enlargement, a measured square may be temporarily drawn on the acetate disc 10 and if its shadow reproduction is also a true square, it will be obvious that there is no distortion in the map projected on the new copy surface. Likewise, the relation of the length of the sides of the projected square to the original square will show the factor of enlargement.

An important use of this invention is for converting flat contour maps into perspective contour maps and for doing this so that the perspective contour map will reveal the area exactly as it appears from a certain distance at a certain altitude. In Fig. 5 there is shown diagrammatically an aircraft 20 which is at an altitude H and a distance D from an area of island 18 and is, therefore, at the perspective angle therefrom. When this has been drawn to the proper scale, this angle may be measured with a protractor and then the protractor 42 is set at this angle to give a fairly accurate solution. However, the perspective angle may be determined more accurately mathematically. In order to determine the perspective angle mathematically, it is necessary to know the altitude to be simulated and the distance from the objective to be simulated. The following tables when the above two factors are read into them give the correct perspective angle and the correct distance in feet and inches from the light source 13 to the center 17 of the circular acetate disc 10.

[Altitude of plane: 1,000 feet]

| Horizontal distance from plane to objective | Perspective angle | Distance from light source to center of acetate tracing of map for the following scales | | | | | | |
|---|---|---|---|---|---|---|---|---|
| | | 1:2,000 | 1:6,000 | 1:12,000 | 1:20,000 | 1:40,000 | 1:60,000 | 1:125,000 |
| 1 mile | 10° 43' | 2' 8¼" | 0' 10¾" | | | | | |
| .5 mile | 20° 45' | 1' 4¹⁵⁄₁₆" | 0' 5⅜" | 0' 5³⁄₁₆" | | | | |

[Altitude of plane: 2,500 feet]

| Horizontal distance from plane to objective | Perspective angle | Distance from light source to center of acetate tracing of map for the following scales | | | | | | |
|---|---|---|---|---|---|---|---|---|
| | | 1:2,000 | 1:6,000 | 1:12,000 | 1:20,000 | 1:40,000 | 1:60,000 | 1:125,000 |
| 2 miles | 13° 19' | 5' 5⅝" | 1' 9¹¹⁄₁₆" | 0' 10⅞" | 0' 6½" | | | |
| 1 mile | 25° 20' | 2' 11¹⁄₁₆" | 0' 11¹¹⁄₁₆" | 0' 5⅞" | | | | |
| .5 mile | 43° 26' | 1' 9¹³⁄₁₆" | 0' 7¼" | 0' 3⅝" | | | | |

[Altitude of plane: 5,000 feet]

| Horizontal distance from plane to objective | Perspective angle | Distance from light source to center of acetate tracing of map for the following scales | | | | | | |
|---|---|---|---|---|---|---|---|---|
| | | 1:2,000 | 1:6,000 | 1:12,000 | 1:20,000 | 1:40,000 | 1:60,000 | 1:125,000 |
| 5 miles | 10° 43' | 13' 5⁵⁄₁₆" | 4' 5¾" | 2' 2⅞" | 1' 4⅛" | 0' 8¹⁄₁₆" | 0' 5⅜" | |
| 3 miles | 17° 31' | 8' 3¹⁄₁₆" | 2' 9¼" | 1' 4⅝" | 0' 10" | 0' 5" | | |
| 2 miles | 25° 20' | 5' 10½" | 1' 11⅜" | 0' 11¹⁄₁₆" | 0' 7" | | | |
| 1 mile | 43° 26' | 3' 7⅝" | 1' 2⁹⁄₁₆" | 0' 7¼" | 0' 4⅜" | | | |
| .5 mile | 62° 10' | 2' 9¹⁵⁄₁₆" | 0' 11⁵⁄₁₆" | 0' 5⅝" | | | | |

[Altitude of plane: 7,500 feet]

| Horizontal distance from plane to objective | Perspective angle | Distance from light source to center of acetate tracing of map for the following scales | | | | | | |
|---|---|---|---|---|---|---|---|---|
| | | 1:2,000 | 1:6,000 | 1:12,000 | 1:20,000 | 1:40,000 | 1:60,000 | 1:125,000 |
| 5 miles | 15° 52' | 13' 8³⁄₁₆" | 4' 6⅞" | 2' 3⁷⁄₁₆" | 1' 4⁷⁄₁₆" | 0' 8¼" | 0' 5½" | |
| 3 miles | 25° 20' | 8' 9³⁄₁₆" | 2' 11¹¹⁄₁₆" | 1' 5½" | 0' 10½" | 0' 5¼" | | |
| 2 miles | 35° 23' | 6' 5¹⁄₁₆" | 2' 1⁵⁄₁₆" | 1' 0¹⁵⁄₁₆" | 0' 7¾" | | | |
| 1 mile | 54° 51' | 4' 7" | 1' 6⁵⁄₁₆" | 0' 9¾" | 0' 5½" | | | |
| .5 mile | 70° 36' | 3' 11¹¹⁄₁₆" | 1' 3⅞" | 0' 7⁹⁄₁₆" | 0' 4¾" | | | |

[Altitude of plane: 10,000 feet]

| Horizontal distance from plane to objective | Perspective angle | Distance from light source to center of acetate tracing of map for the following scales | | | | | | |
|---|---|---|---|---|---|---|---|---|
| | | 1:2,000 | 1:6,000 | 1:12,000 | 1:20,000 | 1:40,000 | 1:60,000 | 1:125,000 |
| 10 miles | 10° 43' | | 8' 11⁹⁄₁₆" | 4' 5¾" | 2' 8¼" | 1' 4⅛" | 0' 10¾" | |
| 5 miles | 20° 45' | 14' 1⅜" | 4' 8⅝" | 2' 4¼" | 1' 4¹⁵⁄₁₆" | 0' 8½" | 0' 5⅝" | |
| 3 miles | 32° 16' | 9' 4⅜" | 3' 1⁷⁄₁₆" | 1' 6¾" | 0' 11¼" | 0' 5⅝" | | |
| 2 miles | 43° 26' | 7' 3¼" | 2' 5⁵⁄₁₆" | 1' 2⁹⁄₁₆" | 0' 8¾" | 0' 4⅜" | | |
| 1 mile | 62° 10' | 5' 7⅞" | 1' 10⅞" | 0' 11⅝" | 0' 6¾" | | | |
| .5 mile | 75° 13' | 5' 2¹⁄₁₆" | 1' 8¹¹⁄₁₆" | 0' 10⁵⁄₁₆" | 0' 6⁵⁄₁₆" | | | |

[Altitude of plane: 12,000 feet]

| Horizontal distance from plane to objective | Perspective angle | Distance from light source to center of acetate tracing of map for the following scales | | | | | | |
|---|---|---|---|---|---|---|---|---|
| | | 1:2,000 | 1:6,000 | 1:12,000 | 1:20,000 | 1:40,000 | 1:60,000 | 1:125,000 |
| 10 miles | 12° 48' | | 9' 0 5/16" | 4' 6 3/16" | 2' 8 1/8" | 1' 4 1/4" | 0' 10 13/16" | |
| 5 miles | 24° 27' | 14' 5 15/16" | 4' 10" | 2' 5" | 1' 5 3/8" | 0' 8 1/16" | 0' 5 15/16" | |
| 3 miles | 37° 09' | 9' 11 3/16" | 3' 3 3/4" | 1' 7 7/8" | 1' 8" | 0' 11 15/16" | 0' 4 13/16" | |
| 2 miles | 48° 39' | 7' 11 15/16" | 2' 7 15/16" | 1' 8" | 0' 9 5/8" | 0' 7 7/8" | | |
| 1 mile | 66° 15' | 6' 6 1/16" | 2' 2 1/4" | 1' 1 1/8" | 0' 7 7/8" | | | |
| .5 mile | 77° 36' | 6' 1 1/16" | 2' 0 9/16" | 1' 0 1/4" | 0' 7 3/8" | | | |

[Altitude of plane: 15,000 feet]

| Horizontal distance from plane to objective | Perspective angle | Distance from light source to center of acetate tracing of map for the following scales | | | | | | |
|---|---|---|---|---|---|---|---|---|
| | | 1:2,000 | 1:6,000 | 1:12,000 | 1:20,000 | 1:40,000 | 1:60,000 | 1:125,000 |
| 15 miles | 10° 43' | | 13' 5 5/16" | 6' 8 11/16" | 4' 0 3/8" | 2' 0 3/8" | 1' 4 1/8" | 0' 7 3/4" |
| 10 miles | 15° 51' | | 9' 11 3/16" | 4' 6 15/16" | 2' 8 15/16" | 1' 4 1/2" | 0' 11" | 0' 5 1/4" |
| 5 miles | 29° 36' | 15' 2 3/16" | 5' 0 3/4" | 2' 6 3/8" | 1' 6 1/4" | 0' 9 1/8" | 0' 6 1/16" | |
| 3 miles | 43° 26' | 10' 10 5/16" | 3' 7 3/8" | 1' 9 13/16" | 1' 1 1/16" | 0' 6 9/16" | | |
| 2 miles | 54° 51' | 9' 2 1/16" | 3' 0 11/16" | 1' 6 3/8" | 0' 11" | 0' 5 1/2" | | |
| 1 mile | 70° 36' | 7' 11 13/16" | 2' 7 13/16" | 1' 3 7/8" | 0' 9 5/16" | | | |
| .5 mile | 80° 01' | 7' 7 3/8" | 2' 6 7/16" | 1' 3 1/4" | 0' 9 1/8" | | | |

[Altitude of plane: 20,000 feet]

| Horizontal distance from plane to objective | Perspective angle | Distance from light source to center of acetate tracing of map for the following scales | | | | | | |
|---|---|---|---|---|---|---|---|---|
| | | 1:2,000 | 1:6,000 | 1:12,000 | 1:20,000 | 1:40,000 | 1:60,000 | 1:125,000 |
| 15 miles | 14° 10' | | 13' 7 7/16" | 6' 9 3/4" | 4' 1 1/16" | 2' 0 1/2" | 1' 4 3/8" | 0' 7 7/8" |
| 10 miles | 20° 45' | | 9' 4 7/8" | 4' 8 7/16" | 2' 9 7/8" | 1' 4 1/8" | 0' 11 15/16" | |
| 5 miles | 37° 09' | 16' 6 1/16" | 5' 6 1/4" | 2' 9 1/8" | 1' 7 7/8" | 0' 9 15/16" | 0' 7 1/16" | |
| 3 miles | 51° 37' | 12' 9 9/16" | 4' 3" | 2' 1 1/2" | 1' 3 3/16" | 0' 7 11/16" | 0' 6 13/16" | |
| 2 miles | 62° 10' | 11' 3 11/16" | 3' 9 1/4" | 1' 10 5/8" | 1' 1 9/16" | 0' 6 13/16" | | |
| 1 mile | 75° 13' | 10' 4 1/8" | 3' 5 3/8" | 1' 8 11/16" | 1' 0 7/16" | 0' 6 3/16" | | |
| .5 mile | 82° 29' | 10' 1 1/16" | 3' 4 3/8" | 1' 8 3/16" | 1' 0 1/8" | 0' 6 1/16" | | |

[Altitude of plane: 30,000 feet]

| Horizontal distance from plane to objective | Perspective angle | Distance from light source to center of acetate tracing of map for the following scales | | | | | | |
|---|---|---|---|---|---|---|---|---|
| | | 1:2,000 | 1:6,000 | 1:12,000 | 1:20,000 | 1:40,000 | 1:60,000 | 1:125,000 |
| 25 miles | 12° 48' | | | 11' 3 7/16" | 6' 9 1/4" | 3' 4 5/8" | 2' 3 1/16" | 1' 1" |
| 15 miles | 20° 45' | | 14' 1 9/16" | 7' 0 11/16" | 4' 2 13/16" | 2' 1 3/8" | 1' 4 15/16" | 0' 8 1/8" |
| 10 miles | 29° 36' | | 10' 1 1/8" | 5' 0 3/4" | 3' 0 7/16" | 1' 6 1/4" | 1' 0 1/8" | |
| 5 miles | 48° 39' | | 6' 7 5/16" | 3' 3 15/16" | 2' 0" | 1' 0" | 0' 8" | |
| 3 miles | 62° 10' | | 5' 7 7/8" | 2' 9 15/16" | 1' 8 3/8" | 0' 10 3/16" | 0' 6 3/4" | |
| 2 miles | 70° 36' | | 5' 3 5/8" | 2' 7 13/16" | 1' 7 1/16" | 0' 9 9/16" | 0' 6 3/8" | |
| 1 mile | 80° 01' | | 5' 0 15/16" | 2' 6 7/16" | 1' 6 1/4" | 0' 9 1/4" | 0' 6 1/4" | |
| .5 mile | 84° 58' | | 5' 0 1/4" | 2' 6 1/8" | 1' 6 1/16" | 0' 9 1/16" | 0' 6" | |

The above tables provide for distance from objective of 25, 15, 10, 5, 3, 2, 1, and 0.5 miles. The scale of the map on the acetate disc 10 must be properly read in the tables. Map scales provided for are: 1:2000, 1:6000, 1:12,000, 1:20,000, 1:40,000, 1:60,000, and 1:125,000. If either the map scale, altitude, or the distance being worked with does not match the values given in the tables, interpolation may be done. The perspective angle X thus determined is set on the protractor 42. The distances thus determined are fixed between the light source 13 and the center of the acetate disc 10. Fig. 5 illustrates how the values in the tables were determined.

*Example of a perspective angle problem*

Assume that a given altitude is 20,000 feet, with a horizontal distance from the objective of 5 miles, and a map scale of 1:15,000. Find the table headed "Altitude of plane: 20,000 feet." Find 5 miles in that table's column one. Thus, it is found that the perspective angle is 37° 10'. This perspective angle is set on the angular adjustment protractor 42. But the tables give no values for maps with the 1:15,000 scale. Interpolation is necessary. The desired value lies somewhere between 1:12,000 and 1:20,000, or a distance somewhere between 2' 9 1/8" and 1' 7 7/8". This is seen in the 20,000 foot table, reading over from 5 miles. The 2' 9 1/8" equals 2.8 feet. Then 2.8 feet is multiplied by its scale value, 1/12,000, and this is multiplied by the desired scale, which is 1/15,000. The answer, 2.24 feet, is the distance fixed between the light source and the center of the acetate map tracing. This is converted to feet-inches 2' 2 7/8". Other problems are worked similarly.

*Limitations of the device*

The image on the new copy surface cannot be seen distinctly when the distance from light source to acetate exceeds 10 feet. When the perspective angle is 10 degrees, the approximate maximum effective distance from light source to acetate is two feet. Perspective angles of less than 10 degrees should not be attempted. The above limitations are based upon what are considered average conditions, using a 2.5-volt flashlight and a distance of two feet from acetate disc 10 to new copy surface 16.

Fig. 2 shows how a flat contour map 50 on the disc 10 has been converted into a perspective contour map 51 on the new copy surface 52. The contour interval on the map 50 to its scale is determined. If, for instance, the map's contour interval is 100 feet, that is, if contour lines 53, 54, 55 and 56 on the map indicate a difference in elevation of 100 feet or 1200 inches, and if the map's scale is 1:2,000, then the map's scale contour interval is $\frac{6}{10}$ inch, which is determined by dividing 1200 by 2000. If the map's scale is 1:12,000 with the same contour interval in the above example, then the map's scale contour interval is $\frac{1}{10}$ inch, determined by dividing 1200 by 12,000.

In preparing the perspective contour map 51 the highest altitude contour interval line 53 is first projected by means of the light source 13 and appears as the perspective contour line 53' on the new copy surface 52. Then assuming that the scale contour intervals are $\frac{1}{10}$ inch as in the last example above, the acetate disc 10 is moved diagonally downward on the vertical adjustment scale 38 a distance exactly equal to the scale contour interval, that is, $\frac{1}{10}$ inch on the scale graduations 46 of the scale 38. Then the projection of the contour line 54 is copied on the new copy surface 52 appearing thereon as at 54', that part which overlaps the contour projection 53' being omitted because it is the part of the area that would be invisible from the particular angle. In a similar way, the acetate disc 10 is lowered successively to produce the contour reproductions 55' and 56', thus completing the particular map 50 mapped on the disc 10. The dash lines 60 indicate the successive planes of the disc 10 as it is moved diagonally downward between each projection.

Thus, by setting the disc 10 at an appropriate selected angle, a perspective map at the particular angle may be made on the new copy surface 16. If the angle of the disc 10 is 90 degrees, that is, parallel to the plane of the new copy surface, the map appearing on the new copy surface will be an undistorted enlargement whose factor of enlargement depends on the relative distance between the new copy surface, the disc and the light source, while when a contour map is placed on the transparent disc, it may be translated into a perspective contour map by following the procedure above outlined of moving the disc a distance proportional to the elevation of the contour lights as above described.

Due to the knockdown construction of the triangular upright 27, it is obvious that the light stand 12 may be disassembled to occupy a minimum amount of space for shipping or storage purposes along with the disc and flashlight support and that it may be easily reassembled whenever needed.

Other modifications and changes in the number and arrangement of the parts may be made by those skilled in the art without departing from the nature of this invention, within the scope of what is hereinafter claimed.

The invention herein described and claimed may be manufactured and used by or for the Government of the United States of America for governmental purposes without the payment of any royalties thereon or therefor.

What is claimed is:

1. In an apparatus of the character described, a transparent member adapted to have a design traced thereon, means for adjustably mounting said transparent member for supporting it at a selected angle, means for indicating the selected angle at which said transparent member is mounted, said adjustable mounting means including means for moving said transparent member a measured distance normal to its plane, means for indicating the amount of movement in said normal direction, a light source, means for supporting said light source on one side of said transparent member and a shadow receiving surface supported on the opposite side of said transparent member.

2. A map perspective and enlargement producing device comprising a transparent disc adapted to have a map surface delineated thereon, a knockdown stand adjustably supporting said transparent disc for angular adjustment and for adjustment normal to its plane, a source of light at one side of said disc and a map receiving surface at the opposite side of said disc, said stand including a pair of feet, an upright supported on each foot, each upright including a clamp for attachment to an edge of said disc.

3. A map perspective and enlargement producing device comprising a transparent disc adapted to have a map surface delineated thereon, a stand adjustably supporting said transparent disc for angular adjustment and for adjustment normal to its plane, a source of light at one side of said disc and a map receiving surface at the opposite side of said disc, said stand including a pair of feet, an upright supported on each foot, each upright including a clamp for attachment to an edge of said disc, a graduated scale, means for adjustably securing said clamp member along said graduated scale permitting and measuring the normal movement of said scale, a protractor extending normal to said scale on which said scale is mounted, and means pivotally securing said protractor to said upright for permitting and indicating the angular adjustment of said disc.

SHELDON HINE.

REFERENCES CITED

The following references are of record in the file of this patent:

UNITED STATES PATENTS

| Number | Name | Date |
|---|---|---|
| 1,980,556 | Sintich | Nov. 13, 1934 |
| 2,094,543 | Lackey | Sept. 28, 1937 |
| 1,228,685 | Magowan | June 5, 1917 |
| 2,072,286 | Wellington | Mar. 2, 1937 |
| 720,820 | Kraus | Feb. 17, 1903 |
| 544,642 | Moore | Aug. 13, 1895 |
| 561,797 | Langworthy | June 9, 1896 |
| 1,109,864 | Nelson | Sept. 8, 1914 |